Figure 1:
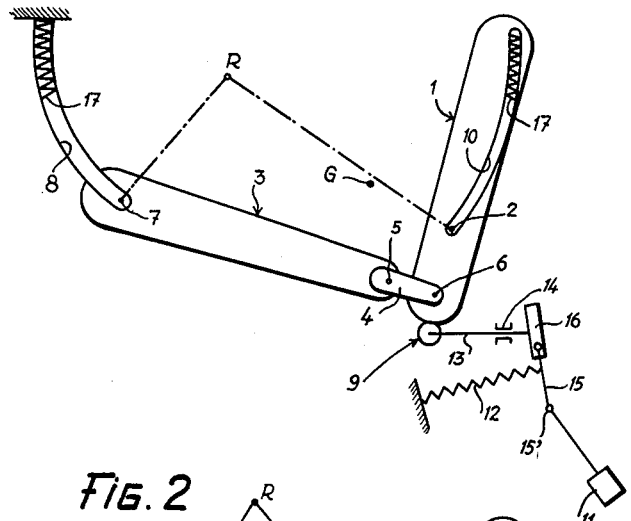

Jan. 26, 1960 — F. BRAUN — 2,922,461
MOVABLE VEHICLE SEAT
Filed Dec. 17, 1956 — 5 Sheets-Sheet 1

INVENTOR.
FRANÇOIS BRAUN
BY
Irwin S. Thompson
ATTY.

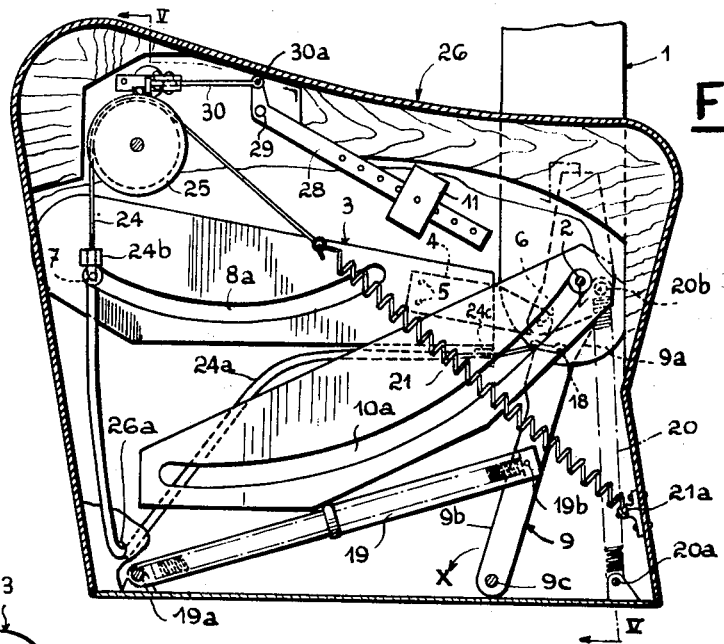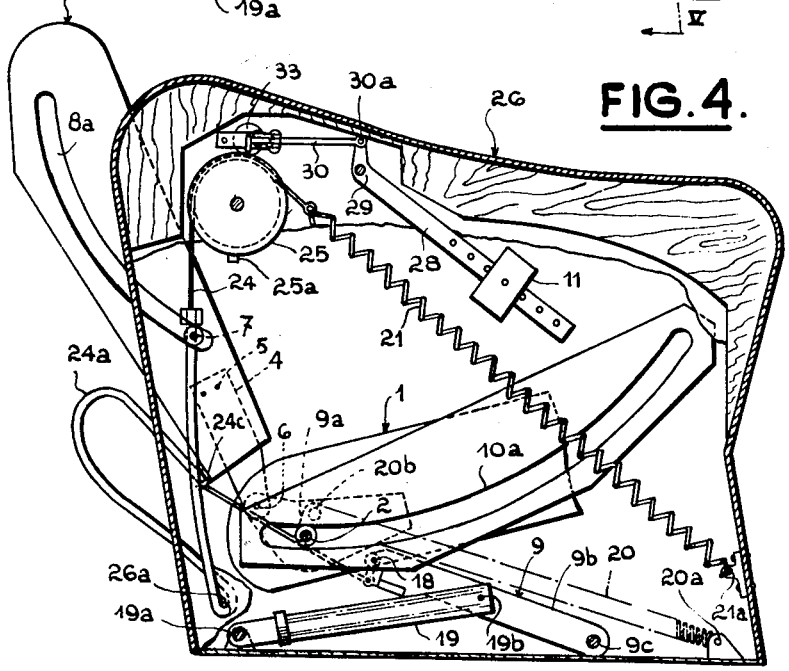

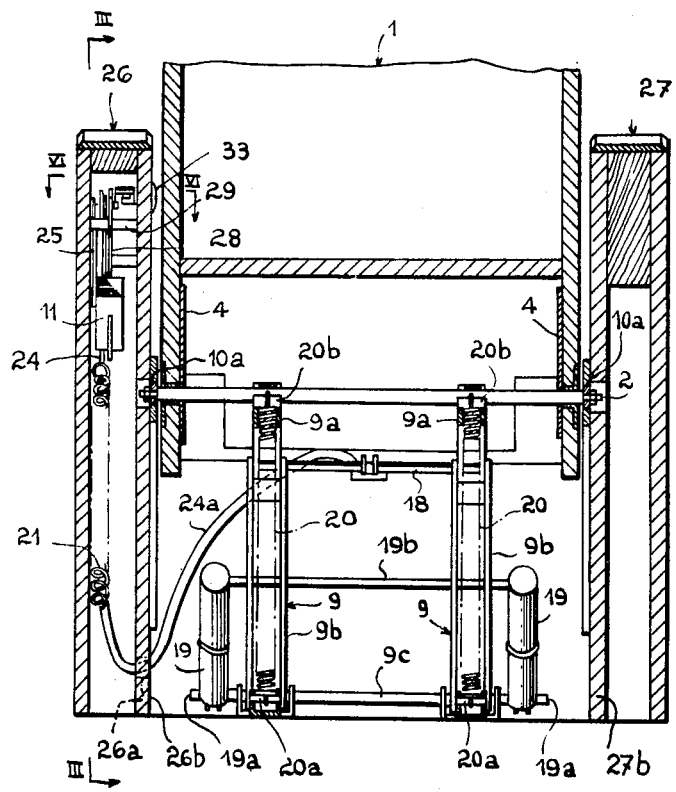

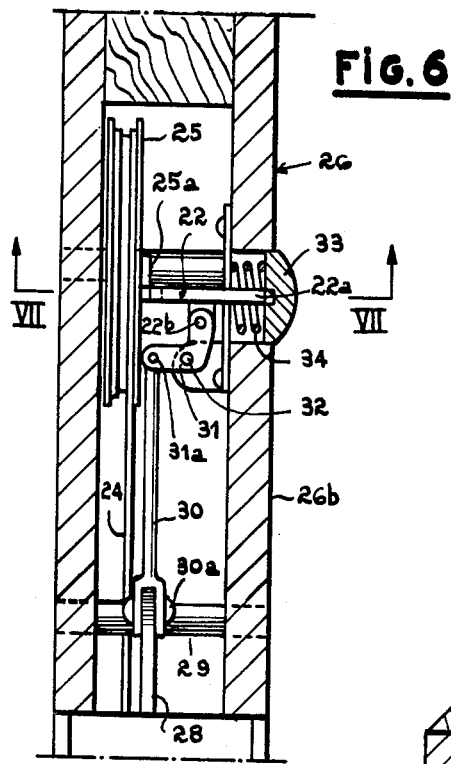
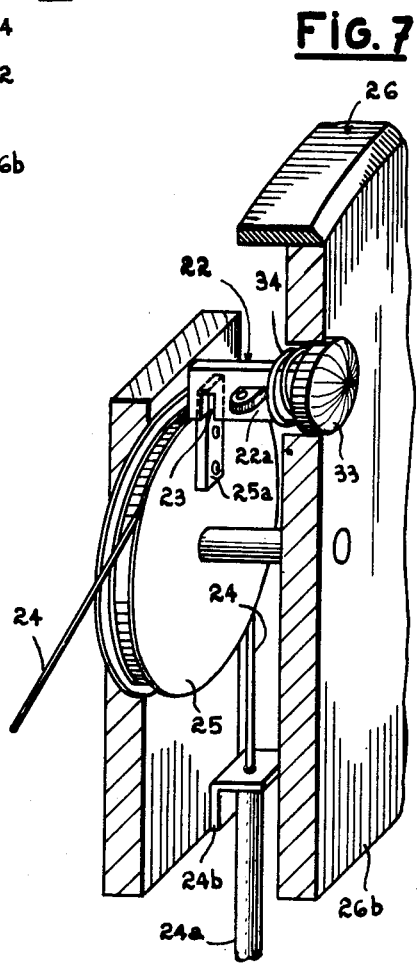

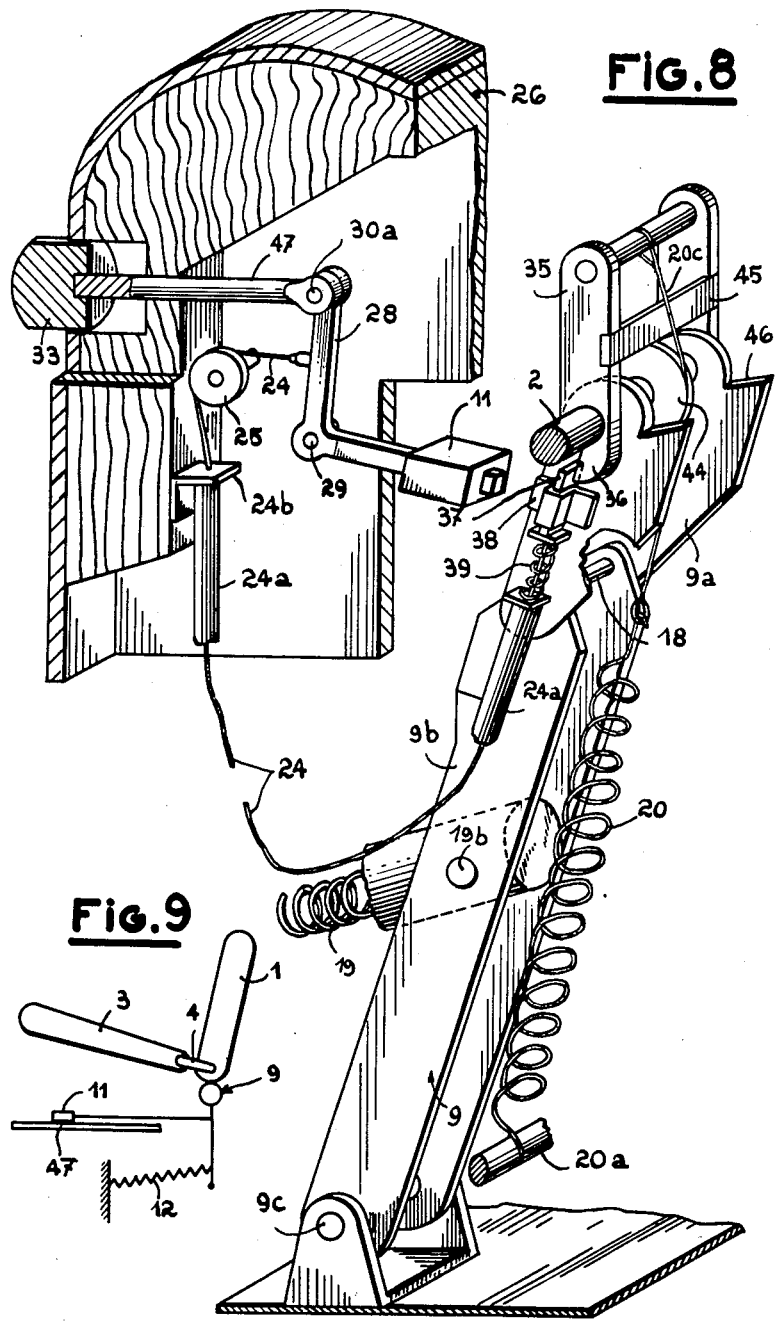

United States Patent Office 2,922,461
Patented Jan. 26, 1960

2,922,461

MOVABLE VEHICLE SEAT

Francois Braun, Schaerbeek (Brussels), Belgium

Application December 17, 1956, Serial No. 628,638

Claims priority, application Belgium December 23, 1955

5 Claims. (Cl. 155—9)

The present invention relates to a movable vehicle seat comprising a movable weight which, when it is moved from an equilibrium position under the effect of shock acting on the vehicle permits the displacement to which the base of the seat is subjected under the same shock while it is being guided in such a manner that its forward position is lifted and that the angle of the back unit with the vertical towards the rear increases.

The invention is applicable both to land vehicles and to air vehicles.

Throughout this specification, the expression "air vehicles" means any aircraft such as aeroplanes, helicopters and gliders used for the transport of human beings through the air without the existence of any mechanical connection, during conveyance, between the vehicle and the ground.

Although specific reference will hereinafter often be made to aeroplanes such reference apply equally to other aircraft or to land vehicles.

Further, throughout the present specification the term "base" means that part of the seat on which a sitter's weight directly rests when being carried in the vehicle.

Seats of the aforesaid type are known which are suspended to trunnions at the upper part of the back unit and which, in their conveyance position, rest on the floor in advance of said trunnions so that the floor will not obstruct the swing of the seat forwardly under the effect of a violent horizontal slowing down of the vehicle. In these seats, the axis of said trunnions is behind and above the center of gravity of the combined weights of the movable parts of the seat and the passenger. The swinging motion of the base and of the back unit forwardly and upwardly caused by the inertia of these movable parts at the moment of a sudden slackening of the vehicle is thus counteracted by gravity. In order to facilitate this swinging motion, it has been proposed to push these movable parts by making a fluid pressure to act in one or more cylinders whose piston is mechanically connected to a rod bearing against the rear surface of the back unit, this fluid pressure being applied when a rotating valve is opened by the movement of said movable weight due to the inertia of the latter at the moment of the sudden horizontal slackening of the vehicle. For that purpose, this movable weight is suspended to a vertical lever keyed on the shaft of said rotating valve.

A seat of this kind has the drawback of being relatively complicated because it necessitates an installation of fluid under pressure. Moreover, it is to be feared that at the moment of an accident, the installation under pressure be no more capable to function.

There are also known seats for vehicles in which the base is guided during its movements under the effect of a shock from front to rear, by rollers engaged into fixed lateral runners, the form and the position of which are such that the rear of the base is lowered and the front of the latter is lifted if, by inertia, the seat moves forwardly. It has not been explained but it can be seen on these known constructions, that the displacement of the seat occurs as if it were about a fulcrum of variable position which, at least at the beginning of the displacement, is situated above and in front of the centre of gravity of the combined weights of the movable parts of the seat and the pasenger.

In order that this seat may occupy a conveyance position, it has been provided to make a spring to act permanently on it. This seat has the drawback that, if the tension of the spring is adjusted in order that the position is good for a light passenger, for example a child, this tension is insufficient for a heavy passenger and then the seat may occupy, without necessity, a position such as that which would be good in the event of an accident. Inversely, if the tension of the spring is adjusted for a heavy passenger, the security position will not always be obtained for a light passenger.

There are also known pivoting seats which are subjected to return springs and which may occupy different convey positions according to the position of the centre of gravity of the passenger relatively to the pivoting axis. These seats are suspended to linkage bars pivoted at their two ends, the upper ends being connected to the arm rests. The most rearwardly inclined convey position is determined by fixed stops which, in the event of a violent horizontal slowing down, must, according to the opinion of the inventor of this seat, be sheared under the effect of inertia of the movable parts of the seat and of the passenger.

However, it is to be noted that, in order that the seat be able to pivot in the direction corresponding to the shearing of the fixed stops, it is necessary that the centre of gravity of the combined weights of the passenger and movable parts of the seat be under the lower pivoting end of said linkage bars. Now, this is not possible as the seat has been proposed. Moreover, even if this centre of gravity were under the lower pivoting end of the linkage bars, the good working of these seats in case of accident would also depend from the weight of the passenger. Consequently, these seats would offer the same drawbacks as the seats of the preceding type.

The object of the present invention consists in seats which have not the drawbacks of the aforesaid types and which surely give a security position inclined rearwardly for a given deceleration which has been chosen at will.

The seat according to the invention is characterized in that its movable parts are maintained in a convey position by a retractable support which is brought into a position in which it is withdrawn from the weight of the passenger and movable parts of the seat, under the control of said movable weight, the latter being displaced against the action of a restraining spring when the vehicle is subjected to a shock from front to rear and in that the guides for the movable parts of the seat have such a position and such a form that, after withdrawal of the retractable support, the rear of the base is lowered, in a manner known per se for a seat the convey position of which is depending from a spring.

With a seat according to the invention, as soon as the retractable support is withdrawn because of the inertia of said movable weight is greater than the action of the restraining spring, the weight of the passenger and of the movable parts of the seat effect automatically, at the same time as the lifting of the front of the base, the lowering of the rear part of the latter and the increasing of the inclination of the back unit in the rearward direction. The base is then in a good position to support the passenger in the case of a shock from front to rear of the vehicle while the back unit is in the good position to support the passenger in the case of a shock from below in an upward direction on the vehicle.

The lowering of the back unit and of the rear portion of the base also has the effect of positioning most of the passenger's body between fixed walls carrying the arm rests. The passenger is thus protected by the latter in the event of laterally acting shocks. The lowering of the centre of gravity of the passenger and of the movable parts of the seat also has the effect of reducing the torsional force which normally tends to rip the rear feet of the seat from the floor of the vehicle.

According to a further feature, which is very advantageous when the vehicle is also liable to be subjected to upwardly directed shocks (such as in an aircraft), the movable weight is also mounted so as to be adapted to move relatively to the vehicle when the latter is subjected to an upward braking force of a size large enough for the inertia of the weight to overcome the force of the restraining spring.

Advantageously, the movable weight is then carried by a lever pivotable about a point located in front of and above the centre of gravity of the weight when it is held stationary by the restraining spring.

Preferably, the retractable support can be formed by a two-part prop the head of which is hinged to the back unit and the foot of which is hinged to the floor, the two parts of the prop being hinged to each other by a hinge which is held in a position of alignment with the head and foot of the prop by a spring when the back unit is in the normal seating position for conveyance of the passenger, and the hinge being adapted to be so far misaligned under the action of the movable weight to enable the prop to be withdrawn from the weight of the passenger and the movable parts of the seat.

A simple method of effecting withdrawal of the retractable support when actuated by the movable weight consists in connecting the said support to a supplementary spring which is held inoperative by a bolt which can be unlocked by the movable weight.

Further, the seat according to the invention can be equipped with means allowing withdrawal of the retractable support independently of the action of the movable weight.

These means permit the passenger to adjust the seat from the sitting position either to a more comfortable position or to one which safeguards him more adequately against shock.

Other features and details of the invention will become evident from the following description with reference to the accompanying drawings which diagrammatically illustrate some examples of a seat according to the invention. In the drawings, Figure 1 is a diagrammatic side view of a seat according to the invention, Figure 2 is a diagrammatic side view of a different embodiment of the seat according to the invention, Figure 3 is a part sectional side elevation of a third embodiment taken on the line III—III in Figure 5, the seat being shown in the position for conveying a passenger in the sitting position, Figure 4 is a view corresponding to that of Figure 3, the seat being shown in its position of maximum inclination, Figure 5 is a sectional view taken on the line V—V in Figure 3, Figure 6 is a part-sectional view taken on the line VI—VI in Figure 5, Figure 7 is a perspective view showing a section taken on the line VII—VII in Figure 6, Figure 8 is a diagrammatic perspective view showing part of a further embodiment of a seat according to the invention, and Figure 9 is a diagrammatic side view of a still further embodiment of a seat according to the invention.

In the various figures like elements are indicated by like reference numerals.

Figure 2:
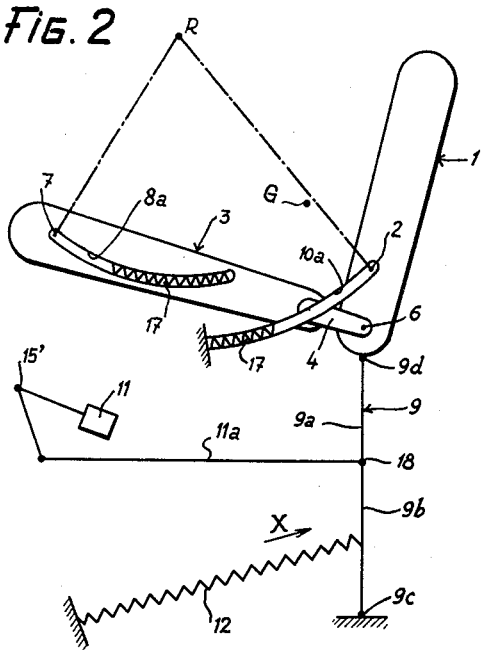

The seat illustrated in Figure 1 comprises a back unit 1 connected to a base 3 by a plate 4 fixed to the latter, such as by bolts 5, and hinged to the back unit by a pivot 6. The base can be moved forwardly whilst its inclination is changed it being carried at the front by a guide (hereinafter described) which causes the front portion of the base to be lifted when it is displaced forwardly. The movable parts of the seat such as the back unit and the base are retained in any adjusted sitting position by a retractable support 9. The support 9 is adapted to be retracted by a movable weight 11 which is displaced relatively to the vehicle when the latter is subjected to a horizontal braking action sufficiently large for the inertia of the weight to overcome the action of a spring 12.

In Figure 1, the support 9 is carried by a member 13 which is adapted to slide in a guide 14 when it is actuated by the inertia of the weight 11 which is mounted on a pivoted lever 15 to which the member 13 is connected by a slide 16. The spring 12 holds the lever 15 in an equilibrium position in which the weight can rock in the event of sudden horizontal deceleration. For this position, the weight 11 is also displaced relatively to the vehicle when the latter is subjected to an upward deceleration which is sufficiently large for the inertia of the weight to overcome the action of the spring 12. Further, the lever 15 pivots about a point 15' which is located in front of and above the centre of gravity of the weight whenh the latter is in rest position under the action of the spring 12.

The movable parts of the seat which are in contact with the passenger are so guided that they move as if they were oscillating about a fulcrum R the position of which is variable and which is situated in front of and above the combined centre of gravity G of the movable parts and the passenger.

During movement of the movable parts of the seat, the back unit 1 moves downwards, and is guided by a lateral guide rail 10 which co-operates with a fixed pivot and which moves with the back unit when the latter descends after retraction of the support 9.

The base 3 is guided at the front by pivot 7 movable into forward slideways 8.

Shock-absorbing springs 17 serve to damp the movement of the base and back unit when the retractable support is being withdrawn.

The embodiment illustrated diagrammatically in Figure 2 differs from that illustrated in Figure 1 in that a flexible mechanical connection such as a cable 11a connects the movable weight 11 to an articulated prop 9 which is normally maintained in its supporting positions of the seat under the action of the spring 12. A lateral guide 10a for guiding the back unit is fixed and co-operates with the pivot 2 which can move in this guide.

A lateral guide 8a which co-operates with the pivot 7 at the front of the seat is attached to the base whilst the pivot 7 is fixed.

The articulated prop 9 is formed by two parts 9a and 9b. The head of the upper part 9a is hinged to the back unit by a pivot 9d and the foot of the lower part 9b is hinged to the floor by a pivot 9c. These two parts of the prop are hinged one to the other by an intermediate hinge 18 which is held in alignment with the head and foot of the prop by the spring 12 when the back unit is in the normal seating position. The hinge 18 is adapted to be moved so far out of alignment by the movable weight 11, when the latter is displaced by a sudden slackening of the vehicle, that the prop is put into an angular position in which it can no more support the weight of the passenger and of the movable parts of the seat.

The spring 12 is mounted so as to oppose downward movement of the back unit and of the rear of the base from the instant when downward movement commences.

The spring 12 which holds the hinge 18 of the prop in the position in which the back unit is supported thereby, acts on the lower part 9b in the direction indicated by the arrow X so that the lever action of the spring on the part 9b relatively to the pivot 9c of the prop decreases during downward travel of the part 9b.

The embodiment illustrated in Figures 3, 4 and 5 differs from the preceding two embodiments in that the hinge connecting the upper part 9a of the prop to the back unit 1 is constituted by the pivot 2 of the back unit. This pivot is guided in fixed lateral slides 10a which are mounted on side walls 26b and 27b of arm rests 26 and 27. Further, a shock-absorber spring 19 which is pivoted to the floor by a pivot 19a and to the lower portion 9b of the prop by a pivot 19b, damps the movement of the base and back unit from the instant such movement commences.

A second damping spring 20, which is pivoted to the floor by a pivot 20a to the rear of the pivot 9c and to the upper part 9a of the prop by a pivot 20b, is arranged to become effective when the seat approaches its end-of-travel position as shown in Figure 4. The pivot 20b is situated at a point of the upper part 9a of the prop, which is not in the alignment determined by the pivot 2 and the hinge 18. The alignment determined by the pivots 20a and 20b intersects the alignment determined by the pivots 9c and 2 in a point above the top pivot 2 of the prop in such a manner that the shock-absorber urges the hinge 18 to move out of alignment with the pivots 9c and 2, for which the prop is in an angular position.

Nevertheless, under the actions of the spring 19, the prop remains in its supporting position of the seat until it is angled by being submitted to the action of a spring 21 attached to a fixed point on the seat, for example to a lug 21a. This spring is held by the locking bolt 22 (see Figures 6 and 7) so as to be incapable of influencing the prop as long as the bolt is not unlocked by the movable weight 11 to which it is connected.

The intermediate hinge 18 of the prop is connected to the spring 21 by a wire 24, for example of the "Bowden" wire type, a part of the core of the cable being wound around a pulley 25 having a projection 25a which abuts against the locking bolt 22 unless the latter is unlocked by the movable weight 11. The sheath 24a of the Bowden wire 24 is fixed at one end to a fixed point 24b and at the other end to the movable base at 24c.

The movable weight 11 is arranged within one of the arm rests 26 or 27, for example in the arm rest 26, and is carried by a lever 28 which is mounted on a pivot 29 the axis of which extends horizontally. This lever is hinged by a pivot 30a to a rod 20 which is hinged by a pivot 31a to a bell-crank lever 31. The bell-crank lever 31 is mounted on a pivot 32 and is hinged to the locking bolt 22 by a pivot 22b.

The locking bolt 22 is formed by a plate 22a which is held by a spring 34 in a position such that it constitutes an abutment for the projection 25a of the pulley 25 when the locking bolt is in the locking position. The plate 22a has a notch 23 into which the projection 25a can slide when the plate 22a is displaced against the action of the force of the spring 34. This displacement is effected either under the action of the movable weight 11 or by pressing against a push-button 33 connected to the bolt 22 and mounted in the wall 26b of the arm rest 26 within reach of the passenger. The push-button enables the passenger to angle or unalign the retractable prop 9 independently of the action of the movable weight.

The retracting spring 21, the Bowden wire 24 and the pulley 25 on which the cable is wound, are also arranged inside the arm rest 26. The Bowden wire enters the arm rest through an opening 26a provided therein.

Referring to Figures 3 to 7, let it be assumed that the passenger is occupying the seat which is in the position corresponding to the normal sitting conveying position as illustrated in Figure 3, and that the aeroplane is subjected to a sudden deceleration caused by a shock acting from the front towards the rear or from the floor towards the roof. During deceleration, the inertia of the movable weight 11 causes the latter to pivot about the pivot 29 bringing the bolt 22 to which it is connected into the unlocking position.

As soon as the pulley 25 is so released, the spring 21 connected to the Bowden wire acts on the core of the wire connected to the intermediate hinge 18 of the prop in such a way as to bring this hinge out of alignment with the pivots 9c and 2, and enabling the prop to be angled.

As soon as the back unit ceases to be supported, the inertia of the weight of the passenger and of the movable parts of the seat cause the latter to move along the guides 8a and 10a.

The arrangement of the guides is such that as the base is lifted forwardly, it is also lowered at the rear and the back unit is inclined rearwardly, placing the passenger in an advantageous position to avoid being thrown violently against any adjacent fixtures. The shock-absorbing spring 19 opposes the downward movement of the back unit and the rear of the base from the instant of commencement of downward movement whilst the shock-absorbing spring 20 begins to act as angling springs and functions as an additional damping unit when the back unit nears its end-of-travel position as illustrated in Figure 4.

The seat is at first returned towards its normal position as illustrated in Figure 3 without requiring the assistance of the passenger. In fact as soon as the inertia of the weight of the passenger and the movable parts of the seat has been damped, the shock absorbing spring 20 returns the seat towards the normal position illustrated in Figure 3. After a short movement of the seat, the force of the spring 19 is added to the force of the spring 20 to return the seat and the passenger about two thirds of the way. Then, by bearing against the arm rests and inclining forwardly, the passenger can return his seat into its normal position.

When the passenger wishes to change to a precautionary position or a more comfortable position, he need only press the push-button 33 to unlock the locking bolt, whereupon the seat will take up an intermediate position depending on the weight of the passenger.

In the embodiment illustrated in Figures 3, 4 and 5, angling of the articulated prop is effected, as hereinbefore described, under the action of a spring 21 as soon as it has been unlocked by the movable weight 11 or a push-button 33.

Figure 8 shows a different way of angling the prop. Means are used which are constituted by an additional piece 35 which is actuated by a wire 20c connected to the spring 20 and passing over the pulley 44. The piece 35 and the pulley 44 are mounted on the pivot pin 2. The piece 35 has a projection 36 against which there normally abuts a locking bolt in the form of a plate 37. The plate is slidably mounted in a guide 38 and is held in abutment with the projection 36 by a spring 39. The plate 37 is connected to one end of the core of the Bowden wire 24 the other end of which is connected to the lever 28. Fixed to this lever is the weight 11, and also connected to it by a rod 47 is the pushbutton 33 mounted in the arm rest 26.

The additional piece 35 has a stop 45 which abuts against a shoulder 46 of the upper part 9a of the prop when the plate 37 forming the locking bolt is unlocked either under the action of the weight 11 or by pressing the push-button 33.

In the position illustrated in Figure 8, in which the piece 35 is locked, the lever action of the spring 20 relatively to the pivot 2 is too small to move the hinge 18 out of alignment with the pivots 9c and 2 of the lower and upper portions of the prop.

After the piece 35 has been unlocked and assumes a position in which the stop 45 abuts against the shoulder 46 of the prop, the lever action of the spring 20 relatively to the pivot 2 is sufficiently large to cause the hinge 18 to move out of alignment with the pivots 9c and 2 of the lower and upper portions of the prop respectively, thus allowing the movable parts of the seat to carry out the movement hereinbefore described.

In the various embodiments hereinbefore described with reference to Figures 1 to 8, the inertia effect of the weight 11 causes the withdrawal of the support or prop of the base and the weight can move both horizontally and vertically if a sufficiently large deceleration acts on the vehicle from the front towards the rear and/or from below in the upward direction.

Figure 9 illustrates another form of the invention in which the weight 11 is connected to the upper portion of the prop and can be moved only in the horizontal direction in a guide 47 under the action of inertia effects caused by a shock acting from the front towards the rear.

This simplified form can be applied for example, to land vehicles which are usually only subjected to horizontal shocks.

It is to be understood that the invention is not limited to the embodiments as illustrated and that many modifications can be made to the form, arrangement and construction of certain of the components without departing from the scope of the present invention as defined in the following claims.

What I claim is:

1. A movable vehicle seat comprising a base, a back unit connected thereto and facing forwardly, a pivot on said back unit, a two-part articulated prop connected to said pivot for supporting the latter in the normal conveyance position, a pivot between the foot of the lower part of said prop and the floor of the vehicle, an intermediate hinge between the two parts of the prop, spring means operatively connected to said prop and urging said intermediate hinge into a position supporting the seat in its normal conveyance position, means urging said prop towards an angled position in which it can no more support the weight of the seat and of the passenger, said last-mentioned means having an action greater than said spring means, locking means for neutralizing the action of said prop-urging means and consequently permitting said prop to rest in its supporting position, a weight, means mounting said weight on said vehicle for movement from an equilibrium position under the urge of inertia when the vehicle is suddenly retarded in its forward or downward movement, a restraining spring operatively connected to said movable weight and urging said movable weight towards its equilibrium position, means connecting said movable weight and said locking means for unlocking the latter when the weight is displaced by inertia, and means operatively associated with said base and said pivot of the back unit of the seat for guiding the front part of the base upwardly and the rear part thereof downwardly and for increasing the angle of the back unit with the vertical.

2. A movable vehicle seat comprising a base, a back unit connected thereto and facing forwardly, a pivot on said back unit, a two-part articulated prop connected to said pivot for supporting the latter in the normal conveyance position, a pivot between the foot of the lower part of said prop and the floor of the vehicle, an intermediate hinge between the two parts of the prop, spring means operatively connected to said prop and urging said intermediate hinge into a position supporting the seat in its normal conveyance position, means urging said prop towards an angled position in which it can no more support the weight of the seat and of the passenger, said last-mentioned means having an action greater than said spring means, locking means for neutralizing the action of said prop-urging means and consequently permitting said prop to rest in its supporting position, a weight, means mounting said weight on said vehicle for movement from an equilibrium position under the urge of inertia when the vehicle is suddenly retarded in its forward or downward movement, a restraining spring operatively connected to said movable weight and urging said movable weight towards its equilibrium position, means connecting said movable weight and said locking means for unlocking the latter when the weight is displaced by inertia, and means operatively associated with said base and said pivot of the back unit of the seat for guiding the front part of the base upwardly and the rear part thereof downwardly and for increasing the angle of the back unit with the vertical, the pivot between the prop and the back unit being engaged in the guide means for the back unit.

3. A movable vehicle seat comprising a base, a back unit connected thereto and facing forwardly, a pivot on said back unit, a two-part articulated prop connected to said pivot for supporting the latter in the normal conveyance position, a pivot between the foot of the lower part of said prop and the floor of the vehicle, an intermediate hinge between the two parts of the prop, spring means operatively connected to said prop and urging said intermediate hinge into a position supporting the seat in its normal conveyance position, means urging said prop towards an angled position in which it can no more support the weight of the seat and of the passenger, said last-mentioned means having an action greater than said spring means, locking means for neutralizing the action of said prop-urging means and consequently permitting said prop to rest in its supporting position, a weight, means mounting said weight on said vehicle for movement from an equilibrium position under the urge of inertia when the vehicle is suddenly retarded in its forward or downward movement, a restraining spring operatively connected to said movable weight and urging said movable weight towards its equilibrium position, means connecting said movable weight and said locking means for unlocking the latter when the weight is displaced by inertia, means operatively associated with said base and said pivot of the back unit of the seat for guiding the front part of the base upwardly and the rear part thereof downwardly and for increasing the angle of the back unit with the vertical, and a damping spring fixed to a point of the vehicle floor at the rear of the foot pivot of the prop and to a point of the upper part of the latter, said two points defining a first line, the point of the foot pivot and of the top pivot of the prop defining a second line, said lines intersecting in a point above this top pivot, the action of this damping spring urging the prop towards an angled position being less than that of the spring urging the intermediate hinge of said prop into the position for supporting the seat in its normal conveyance position.

4. A movable vehicle seat comprising a base, a back unit connected thereto and facing forwardly, a pivot on said back unit, a two-part articulated prop connected to said pivot for supporting the latter in the normal conveyance position, a pivot between the foot of the lower part of said prop and the floor of the vehicle, an intermediate hinge between the two parts of the prop, spring means operatively connected to said prop and urging said intermediate hinge into a position supporting the seat, a pivoting piece pivoting around the pivot between the back unit and the upper part of the prop, means for locking said pivoting piece relatively to the upper part of the prop, a damping spring fixed to a point of the vehicle floor at the rear of the foot pivot of the prop and to a point of said pivoting piece that is above said first-mentioned pivot when said pivoting piece is in its locked position, a weight, means mounting said weight on said vehicle for movement from an equilibrium position under the urge of inertia when the vehicle is suddenly retarded in its forward or downward movement, a restraining spring operatively connected to said movable weight and urging said movable weight towards its equilibrium position, means connecting said movable weight and said locking means for unlocking the latter when the weight is displaced by inertia, means on the upper part of the prop for stopping the rotation of said pivoting piece in a position in which said damping spring has an action on the prop greater than the action of the spring urging the intermediate hinge of the latter in its supporting position of the seat, and means operatively associated with said base and said pivot of the back unit of the seat for guiding the front part of the base upwardly and the rear part thereof downwardly and for increasing the angle of the back unit with the vertical.

5. A movable vehicle seat comprising a base, a back unit connected thereto and facing forwardly, a pivot on said back unit, a two-part articulated prop connected to said pivot for supporting the latter in the normal conveyance position, a pivot between the foot of the lower part of said prop and the floor of the vehicle, an intermediate hinge between the two parts of the prop, spring means operatively connected to said prop and urging said intermediate hinge into a position supporting the seat in its normal conveyance position, means urging said prop towards an angled position for which it can no more support the weight of the seat and of the passenger, said last-mentioned means having an action greater than said spring means, locking means for neutralizing the action of said prop-urging means and consequently permitting said prop to rest in its supporting position, a weight, means mounting said weight on said vehicle for movement from an equilibrium position under the urge of inertia when the vehicle is suddenly retarded in its forward or downward movement, a restraining spring operatively connected to said movable weight and urging said movable weight towards its equilibrium position, means connecting said movable weight and said locking means for unlocking the latter when the weight is displaced by inertia, means independent of said weight for unlocking said locking means, and means operatively associated with said base and said pivot of the back unit of the seat for guiding the front part of the base upwardly and the rear part thereof downwardly and for increasing the angle of the back unit with the vertical.

References Cited in the file of this patent

UNITED STATES PATENTS

| | | |
|---|---|---|
| 2,660,222 | Woodsworth | Nov. 24, 1953 |
| 2,725,921 | Markin | Dec. 6, 1955 |
| 2,823,730 | Lawrence | Feb. 18, 1958 |

FOREIGN PATENTS

| | | |
|---|---|---|
| 151,161 | Austria | Oct. 25, 1937 |
| 1,005,756 | France | Jan. 2, 1952 |